(12) United States Patent
Tehranchi

(10) Patent No.: US 7,829,506 B1
(45) Date of Patent: Nov. 9, 2010

(54) CLAY STABILIZING AQUEOUS DRILLING FLUIDS

(76) Inventor: Kamyar Tehranchi, 13107 Manison Ct., Cypress, TX (US) 77429

( * ) Notice: Subject to any disclaimer, the term of this patent is extended or adjusted under 35 U.S.C. 154(b) by 906 days.

(21) Appl. No.: 11/589,503

(22) Filed: Oct. 30, 2006

(51) Int. Cl.
*C09K 8/60* (2006.01)
*C09K 8/54* (2006.01)
*C09K 8/584* (2006.01)
*C08B 37/00* (2006.01)

(52) U.S. Cl. .................. 507/111; 507/110; 507/130; 507/259

(58) Field of Classification Search .............. 507/259, 507/111, 110, 130
See application file for complete search history.

(56) References Cited

U.S. PATENT DOCUMENTS

| | | | |
|---|---|---|---|
| 2,417,235 A | 3/1947 | Cannon | 252/8.5 |
| 2,786,027 A | 3/1957 | Salathiel | 252/8.5 |
| 3,417,017 A | 12/1968 | Kolaian et al. | 252/8.5 |
| 3,637,493 A | 1/1972 | Kolaian | 252/8.5 |
| 3,843,524 A | 10/1974 | Perricone et al. | 252/1 |
| 3,956,141 A | 5/1976 | Walker | 252/8.5 |
| 4,090,968 A | 5/1978 | Jackson et al. | 252/8.5 |
| 4,123,366 A | 10/1978 | Sauber et al. | 252/8.5 |
| 4,142,595 A | 3/1979 | Anderson et al. | 175/72 |
| 4,422,947 A | 12/1983 | Dorsey et al. | 252/8.5 |
| 4,447,341 A | 5/1984 | Block | 507/124 |
| 4,650,593 A | 3/1987 | Slingerland | 252/8.5 |
| 4,652,384 A | 3/1987 | Francis et al. | 252/8.51 |
| 4,652,606 A | 3/1987 | Slingerland | 525/54.2 |
| 4,655,942 A | 4/1987 | Dickert, Jr. et al. | 507/120 |
| 4,719,021 A | 1/1988 | Branch, III | 252/8.514 |
| 4,802,998 A | 2/1989 | Mueller et al. | 507/134 |
| 4,822,500 A | 4/1989 | Dobson, Jr. et al. | 252/8.551 |
| 5,009,267 A | 4/1991 | Williamson et al. | 166/271 |
| 5,096,603 A | 3/1992 | Peiffer et al. | 507/118 |
| 5,342,530 A | 8/1994 | Aften et al. | 507/222 |
| 5,380,706 A * | 1/1995 | Himes et al. | 507/129 |
| 5,618,780 A * | 4/1997 | Argillier et al. | 508/503 |
| 5,635,458 A | 6/1997 | Lee et al. | 507/240 |
| 5,652,200 A | 7/1997 | Davies et al. | 507/100 |
| 5,658,859 A | 8/1997 | Burba, III et al. | 507/111 |
| 5,707,940 A | 1/1998 | Bush et al. | 507/138 |
| 5,789,349 A | 8/1998 | Patel | 507/121 |
| 5,807,811 A | 9/1998 | Malchow, Jr. | 507/128 |
| 5,858,928 A | 1/1999 | Aubert et al. | 507/128 |
| 5,925,598 A | 7/1999 | Mody et al. | 507/140 |
| 6,124,244 A | 9/2000 | Murphey | 507/111 |
| 6,180,571 B1 | 1/2001 | Sifferman et al. | 507/110 |
| 6,315,824 B1 | 11/2001 | Lauzon | 106/287.2 |
| 6,410,488 B1 | 6/2002 | Fefer et al. | 507/103 |
| 6,423,802 B1 | 7/2002 | Miller | 526/287 |
| 6,461,999 B1 | 10/2002 | Fanta et al. | 508/216 |
| 6,492,305 B2 | 12/2002 | Sifferman et al. | 507/212 |
| 6,500,785 B1 | 12/2002 | Carminati et al. | 507/103 |
| 6,706,667 B1 | 3/2004 | Smith | 507/118 |
| 6,764,981 B1 | 7/2004 | Eoff et al. | 507/110 |
| 6,774,089 B2 | 8/2004 | Rayborn | 507/112 |
| 2004/0157748 A1 | 8/2004 | Dino | 507/100 |
| 2005/0037930 A1 | 2/2005 | Horton | 507/128 |

* cited by examiner

*Primary Examiner*—Timothy J. Kugel
*Assistant Examiner*—Atnaf Admasu
(74) *Attorney, Agent, or Firm*—Keith B Willhelm

(57) ABSTRACT

Aqueous fluids for circulation through a well during drilling operations, especially drilling operations where shale and another clay bearing formations are encountered, and methods for circulating such clay stabilizing drilling fluids are provided for. The drilling fluid comprises an aqueous base fluid, a viscosifying polymer, a starch, and a chloride-free clay stabilizer. In one embodiment, the starch is selected from the group consisting of potato and corn starch and mixtures thereof and is present in relatively high amounts, i.e., starch in amounts from about 6 to about 18 lb/barrel of fluid, and stabilizer in amounts up to about 3% by volume of fluid. Other embodiments provide concentrations of polymer, starch, and clay stabilizer effective to provide the fluid with clay swelling of about 10% or less, preferably about 5% or less, and shale disintegration of about 10% or less, preferably about 5% or less. Preferably the novel fluids also comprise an environmentally friendly lubricant and surfactant.

40 Claims, No Drawings

CLAY STABILIZING AQUEOUS DRILLING FLUIDS

FIELD OF THE INVENTION

The present invention relates to fluids used in oil and gas well drilling operations and, and more particularly, to aqueous drilling fluids suitable for use in drilling operations where shale and other clay bearing formations are encountered.

BACKGROUND OF THE INVENTION

Hydrocarbons, such as oil and gas, may be recovered from various types of subsurface geological formations. Such formations typically consist of a porous layer, such as limestone and sands, overlaid by a nonporous layer. Hydrocarbons cannot rise through the nonporous layer, and thus, the porous layer forms a reservoir in which hydrocarbons are able to collect. A well is drilled through the earth until the hydrocarbon bearing formation is reached. Hydrocarbons then are able to flow from the porous formation into the well.

In conventional drilling processes, a drill bit is attached to a series of pipe sections is referred to as the drill string. The drill string is rotated and, as the drilling progresses, it is extended by adding more pipe sections. Larger diameter pipes, or casings, also are placed and cemented in the well to prevent the sides of the well from caving in. Once an appropriate depth has been reached, the casing is perforated at the level of the oil bearing formation. If necessary, various completion processes then are performed to enhance the ultimate flow of oil from the formation. The drill string is withdrawn and replaced with a production string. Valves and other production equipment are connected to the well so that the hydrocarbons may flow in a controlled manner from the formation, into the cased well bore, and through the production string up to the surface for storage or transport.

As a well bore is drilled deeper and passes through hydrocarbon producing formations, the production of hydrocarbons must be controlled until the well is completed and the necessary production equipment has been installed. The most common way of controlling production during the drilling process is to circulate a drilling fluid or "mud" through the well bore. Typically, the fluid is pumped down the drill string, through the bit, and into the well bore. The hydrostatic pressure of the drilling fluid in the well bore relative to the hydrostatic pressure of hydrocarbons in the formation is adjusted by varying the density of the drilling fluid, thereby controlling the flow of hydrocarbons from the formation.

Drilling fluids, however, are used for a number of purposes. As the drill string is rotated and the bit cuts through the earth, a tremendous amount of heat and large quantities of cuttings are generated. The drilling fluid serves to lubricate and cool the drill bit. As it is recirculated back up the well bore, the drilling fluid also carries cuttings away from the bit and out of the well bore. The drilling fluid also helps stabilize uncased portions of the well bore and prevents it from caving in.

Drilling fluids may be classified based on their major liquid phase, i.e., as water to base or nonwater base fluids. Nonwater based fluids typically incorporate diesel oil, mineral oil, or a synthetic fluid such as olefin oligomers of ethylene. Water base or aqueous fluids incorporate either fresh water, seawater, or a brine. Both types of fluids may contain various other additives to impart desirable chemical and physical properties to the fluid.

Aqueous fluids have a number of significant advantages over nonwater base fluids. Typically, they do not pose as great an environmental risk as oil and synthetic fluid base fluids. Water base fluids, therefore, may be disposed of more easily and economically and are likely to create less damage in the event of accidental discharge. They also are much cheaper because their major liquid phase is water, especially when seawater is used in offshore drilling operations. Oils and synthetic fluids are more costly and must always be transported to the site. They also can present health hazards to personnel working with the fluid.

Water based fluids, however, have suffered significant shortcomings, especially when drilling through shale and other clay bearing formations. Clay tends to absorb water. As a clay bearing formation absorbs water, it swells. The swelling can result in a well bore that is out of gage, making it more difficult to insert and set casing. Swelling also can create resistance which increases the energy required to rotate the drill string or, in worst cases, causes the pipe to get stuck. Clay cuttings can clump and stick to the drill bit, what is referred to as bit balling. Also, as clayey cuttings are released into the fluid, it increases the viscosity of the fluid and makes it more difficult to pump. Swelling of a clay bearing formation also can fracture the formation and make it more susceptible to crumbling, which in turn releases even more clay into the fluid. Worse yet, the formation may become so fragile the well bore walls slough off or cave in.

Problems relating to the interaction of water with clays are especially acute in directional drilling where a well bore is being drilled along a clay bearing formation instead of simply through it. Such problems also are exacerbated because drilling commonly is conducted in an overbalanced condition. That is, the hydrostatic pressure of drilling fluid in the well bore exceeds the pressure of hydrocarbons in the formation thereby preventing the flow of hydrocarbons into the well bore. While this minimizes the to risk that a well will blowout, a major consequence of overbalanced drilling operations is that water from the fluid may be able to penetrate clay bearing formations to a much greater extent.

Various approaches have been taken to avoid such problems with aqueous drilling fluids. Stabilization of clay particles may be achieved by controlling the charge and is electrolytic characteristics of the drilling fluid, for example, by adding various salts. Sodium chloride, calcium chloride, ammonium chloride, and potassium chloride have been used to inhibit shale swelling with the latter being perhaps the most common. Salts have been used in combination with other compounds, such as water-soluble quaternary amine-based cationic polyelectrolytes and polymers such as partially-hydrolyzed polyacrylamide which tend to encapsulate clay particles. Water-soluble organic polar compounds, such as glycerol, glycol, sorbitol, erythritol, and other polyhydroxy alcohols; mixtures of polyvalent metal/guanidine complexes, cationic starches, and polyglycols; glycol compounds and derivatives thereof, and mixtures of glycols and certain organic cations and organic potassium salts have been used as well. Examples of such approaches are disclosed in U.S. Pat. No. 4,447,341 to J. Block, U.S. Pat. No. 5,342,530 to C. Aften et al., U.S. Pat. No. 5,635,458 to L. Lee et al., U.S. Pat. No. 5,925,598 to F. Mody et al., and U.S. Pat. No. 6,706,667 to C. Smith.

Another approach involves adding fluid loss control additives which serve to limit the flow of water from the drilling fluid by coating the well bore walls or building up a filter cake on the walls. The film or cake formed on the wall serves to protect permeable, hydrocarbon bearing formations from contamination from cuttings and fluid components, but it also helps to stabilize the well bore wall and to minimize contact between water and clay in the formation. Various polymers, such as acrylamido-methyl-propane sulfonate polymer and other polyacrylamides, polyacrylates, and carboxymethylcellulose, polyanionic cellulose, and other cellulosic polymers, have been commonly used for such purposes.

Starches, however, are perhaps the most common fluid loss control additive. Natural starches may be derived from corn, potatoes, and other starch producing plants, but they suffer from biodegradation and thermal instability above approximately 225° F. Excessive amounts of starch also tend to thicken the fluid excessively. Thus, various modified starches which are less susceptible to degradation by bacteria or high temperatures and provide improved rheological and thixotropic properties have been proposed for use as fluid loss control additives, either alone or in combination with other additives. Carboxymethyl and hydroxypropyl starch have been widely used. Other modified starches include pregelatinized starches, starch esters, prehydrolyzed starches, cationic starches such as tertiary and quaternary ammonium starches, various cross-linked starches. High amylose content starches have also been proposed as having relatively little effect on the viscosity and rheological properties of drilling fluids. Examples of such approaches include U.S. Pat. No. 2,786,027 to R. Salathiel, U.S. Pat. No. 3,956,141 to T. Walker, U.S. Pat. No. 4,090,968 to J. Jackson et al., U.S. Pat. No. 4,123,366 to C. Sauber et al, U.S. Pat. No. 4,422,947 to D. Dorsey et al., U.S. Pat. No. 4,652,384 to R. Slingerland, U.S. Pat. No. 4,655,942 to J. Dickert, Jr., et al., U.S. Pat. No. 4,719,021 to H. Branch, III, U.S. Pat. No. 4,822,500 to J. Dobson, Jr., et al., U.S. Pat. No. 5,658,859 to J. Burba, III, et al., U.S. Pat. No. 6,124,244 to J. Murphey, U.S. Pat. No. 6,180,571 to T. Sifferman et al., U.S. Pat. No. 6,492,305 to T. Sifferman et al., and U.S. Pub. Pat. Appl. 2004/0157748 of D. Dino.

Starches also have been used in drilling fluids as viscosifiers, as dispersants for clay solids, U.S. Pat. No. 3,417,017 to J. Kolaian et al. and U.S. Pat. No. 3,637,493 to J. Kolaian, and as gelling agents, U.S. Pat. No. 5,789,349 to A. Patel.

Despite those extensive efforts drilling through shale and other clay bearing formations with aqueous drilling fluids remains problematic. Many still regard using oil synthetic base fluids which lack significant amounts of water as the best solution and perceive the cost, environmental problems, and safety issues of oil and synthetic base fluids as lesser evils.

An object of this invention, therefore, is to provide improved drilling fluids and, in particular, aqueous drilling fluids that are more suitable for use in drilling through shale and other clay bearing formations.

It also is an object to provide drilling fluids suitable for use in drilling through shale and other clay bearing formations that may be more easily and economically formulated.

Another object of this invention is to provide drilling fluids suitable for use in drilling through shale and other clay bearing formations that may be disposed of more economically and presents fewer health and environmental risks.

Yet another object is to provide such drilling fluids wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides novel fluids for circulation through a well during drilling operations especially drilling operations where shale and another clay bearing formations are encountered, and methods for circulating such clay stabilizing drilling fluids. The drilling fluid comprises an aqueous base fluid, a viscosifying polymer, a starch, and a chloride-free clay stabilizer. In one embodiment, the starch is selected from the group consisting of potato and corn starch and mixtures thereof and is present in relatively high amounts, i.e., starch in amounts from about 6 to about 18 lb/barrel of fluid, and stabilizer in amounts up to about 3% by volume of fluid.

Other embodiments provide concentrations of polymer, starch, and clay stabilizer effective to provide the fluid with clay swelling of about 10% or less, preferably about 5% or less, and shale disintegration of about 10% or less, preferably about 5% or less. Preferably the novel fluids also comprise an environmentally friendly lubricant and surfactant.

It will be appreciated that the combination of relatively high amounts of a starch and chloride-free clay stabilizer provide the novel fluids minimize problems associated with drilling through shale and other clay bearing formations to a level comparable with oil and synthetic base fluids. Moreover, since they are water based, they are more economical than oil and synthetic base fluids, and do not pose the health and environmental risks associated with oil and synthetic base fluids.

DESCRIPTION OF ILLUSTRATIVE EMBODIMENTS

The clay stabilizing aqueous drilling fluids of the subject invention comprise an aqueous base fluid, a viscosifying polymer, a starch, and a chloride-free clay stabilizer. The aqueous base fluid of the drilling fluid may be any aqueous liquid capable of forming a solution and is compatible with the selected polymer and the other components of the drilling fluid. The term "solution" as used herein, encompasses dispersions, emulsions, or any other substantially homogeneous mixture, as well as true solutions. The aqueous base fluid preferably is fresh water, seawater, or brine. It will be understood, however, is that a certain amount of hydrocarbons may seep into the fluid from a formation.

Polymers

The polymer component of the novel drilling fluids primarily serves to enhance the viscosity of the drilling fluid such that it is capable of lubricating the drill bit and carry cuttings away from the drill bit to the surface. Accordingly, polymers useful in the novel drilling fluids include substantially any water-soluble, viscosity-enhancing polymer of the type conventionally used in drilling fluids. A variety of such polymers is known to workers in the art and is commercially available from a number of sources.

For example, the polymer component may be either a biopolymer or a synthetic polymer. Suitable biopolymers may be selected from the group consisting of polysaccharides and modified polysaccharides, such as xanthan gum, guar gum, wellum gums, gellan gums, succinoglycan, succinoglycan polysaccharides, scleroglycan, schleroglucan polysaccharides, polyvinylsaccharides, o-carboxychitosans, polyanionic cellulose, carboxymethylcellulose, hydroxyethylcellulose, hydroxypropylcellulose, and natural and modified starches, and mixtures thereof, or consisting of any subgroup of the foregoing.

Suitable, synthetic polymers may be selected from the group consisting of polyvinyl alcohol, polyethylene oxide, polyvinyl pyrrolidone, and acrylamide polymers, aluminum and mixed metal hydroxide silicates, and mixtures thereof, or consisting of any subgroup of the foregoing. Preferred acrylamide polymers may be selected from the group consisting of polyacrylamide ("PA", i.e., acrylamide homopolymer having substantially less than about 1% of its acrylamide groups converted to carboxylate groups), partially hydrolyzed polyacrylamide ("PHPA", i.e., acrylamide homopolymers having more than about 1%, but not 100%, of its acrylamide groups converted to carboxylate groups), acrylamide copolymers, acrylamide terpolymers containing to acrylamide, a second species, and a third species, and acrylamide tetrapolymers containing acrylamide, acrylate, a third species, and a fourth species, and mixtures thereof, or consisting of any subgroup of the foregoing. The average molecular weight of the acrylamide polymer is generally from about 10,000 and about 50,000,000, preferably is from about 250,000 to about 20,000,000, and most preferably is from about 1,000,000 to about 18,000,000.

It will be appreciated, however, that the viscosifying polymers may contribute to remediation of problems associated with drilling through clay bearing formations. They may tend to coat shale formations, encapsulate clay bearing cuttings in the fluid, and to prevent the dispersion of clay particles in the fluid which may raise the viscosity of the fluid to unacceptable levels. The viscosifying polymer also may contribute to fluid loss control by contributing to the formation of a film or filter cake on the well bore wall. Polymers such as long-chain, high molecular weight polymerized cellulose are preferred for such reasons. Polyanionic cellulose ("PAC") is especially preferred.

The concentration of the polymer is generally from about 1 to about 6 lb/bbl of fluid and, preferably, is from about 1 to about 3 lb/bbl. The precise concentration of the polymer primarily will be determined by the degree of viscosity to be imparted to the fluid and may be determined by routine effort.

Starch

The starch component of the novel clay inhibiting drilling fluids primarily serves to reduce fluid loss from the well bore and to increase the viscosity of the fluid. It is also believed that the starch tends to encapsulate clay particles in the fluid and to form a particularly effective film on the well bore to minimize the exposure of clay to water. While it is believed that all starches may to varying degrees provide such benefits, the starches used in the novel fluids in combination with the viscosifying polymer and clay stabilizer provide the fluids with performance comparable to oil and synthetic base fluids in respect to problems commonly encountered in drilling through clay bearing formations.

The starch component preferably is selected from the group consisting of potato and corn starch, and mixtures thereof. Preferably the starch is a modified potato or corn starch. Since starches are naturally biodegradable, the starch preferably is modified, for example, to impart resistance to bacterial attack. Methods for producing suitable starches are known in the art, and they are commercially available from a number of sources.

The starch is used in relatively high concentrations, i.e., preferably from about 6 to about 18 lb/barrel of fluid. More preferably, the starch is used in concentrations of from about 6 to about 12 lb/barrel of fluid. The precise concentration of the starch is primarily will be determined by the degree of fluid control to be imparted to the fluid and may be determined by routine effort. It is preferred, however, that the amount of starch, in combination with the amounts of polymer and stabilizer components be coordinated to provide clay stabilization properties comparable to those of oil and synthetic based fluids, e.g., clay swelling of about 10% or less and shale disintegration of about 10% or less. Preferably, the amounts will be coordinated to provide clay swelling of about 5% or less and/or shale disintegration of about 5% or less.

It will be appreciated that such concentrations are higher than those typically used in drilling fluids. While it has been suggested that some starches may be used in specific formulations for specific purposes at concentrations as high as 15 lb/barrel, as a practical matter starch concentrations used commonly in drilling fluids range from about 1 to about 5 lbs/barrel. Higher concentrations are rarely used because of the excessive rise in the viscosity of the fluid. It has been observed, however, that the clay stabilizing properties of the novel fluids have been improved relative to prior art fluids without raising the viscosity of the fluids to unacceptably high levels as would have been expected by workers in the art.

Clay Stabilizer

The chloride-free clay stabilizer component of the novel clay stabilizing drilling fluids, as it name implies, serves primarily to stabilize clay particles in the fluid. In order to minimize environmental and disposal problems, however, the clay stabilizer is chloride-free. That is, the clay stabilizer does not release significant amounts of chloride ions into the fluid as do the salts commonly used for clay stabilization. The chloride-free clay stabilizer also may contribute to the formation of filter cake on the wall of the well bore and, therefore, to reduction of fluid loss. In any event, the chloride-free clay stabilizers used in the novel fluids in combination with the viscosifying polymer and starch reduce clay associated problems to levels comparable to oil and synthetic base fluids.

The chloride-free clay stabilizer may be selected from the group consisting of amines, such as neutralized amines, such as mixtures of 1,6 hexanediamine and formic acid, and quaternary polyamines, and mixtures thereof. Preferably the chloride-free clay stabilizer is an amine based surfactant. Methods for producing suitable clay stabilizers are known in the art, and they are commercially available from a number of sources.

The chloride-free clay stabilizer preferably is used in relatively high concentrations, i.e., up to about 3% by volume. Preferably, the chloride-free clay stabilizer is used in concentrations of from about 1 to about 3 vol %. The precise concentration of the clay stabilizer primarily will be determined by the degree of clay stabilization to be imparted to the fluid and may be determined by routine effort. Preferably, the amount of stabilizer, in combination with the amounts of polymer and starch components, are coordinated to provide clay stabilization properties comparable to those of oil and synthetic based fluids, e.g., clay swelling of about 10% or less and shale disintegration of about 10% or less. Preferably, the amounts will be coordinated to provide clay swelling of about 5% or less and/or shale disintegration of about 5% or less.

It will be appreciated that such concentrations are significantly higher than those typically used in drilling fluids. For example, the manufacturer's recommended dosage of a preferred amine-based clay stabilizer is 0.3 vol %.

Additives

The enhanced clay stabilization properties are believed to result from the combination of polymer, starch, and stabilizer components described above. The novel clay stabilizing drilling fluids, however, may comprise various additives that enhance the efficacy of the fluid, especially additives that do not significantly affect the clay stabilization properties of the fluid but which may impart various nonessential, but desirable properties to the fluid. Many such additives are known to workers in the art and are commercially available from a number of sources.

For example, the novel fluids preferably will comprise additives designed to enhance the lubrication of the drill bit without creating environmental or disposal problems. Accordingly, the lubricant preferably is water soluble and nontoxic. By nontoxic it is meant that when incorporated into the fluid, the lubricant does not cause the fluid to fail the LC50 test. Preferably, they will have a LC50 greater than 550,000. A variety of such lubricants is known and commonly used in aqueous drilling fluids and, in general may be used in the novel fluids provided they are compatible with the other components.

The concentration of lubricant is generally up to about 3.5% by volume. It will be appreciated that such concentrations are significantly higher than those typically used in drilling fluids. For example, the manufacturer's recommended dosage of a preferred lubricant is 0.2 vol %.

The novel fluids also preferably comprise a surfactant which primarily serves to assist in dispersing clay and other solid particles in the fluid without creating environmental or disposal problems. Accordingly, surfactants used in the novel drilling fluids are substantially any nontoxic, water-soluble agent suitable for use in aqueous drilling fluids that are compatible with the other components and act to disperse solids in the fluid.

The concentration of surfactant is generally up to about 3.5% by volume. It will be appreciated that such concentrations are significantly higher than those typically used in drilling fluids. For example, the manufacturer's recommended dosage of a preferred surfactant is up to 0.1 vol %.

Additional fluid loss control additives also may be incorporated into the novel fluids. Suitable fluid loss control additives include other starches and various polymers, such as acrylamido-methyl-propane sulfonate polymer and other polyacrylamides, polyacrylates, and carboxymethylcellulose, polyanionic cellulose, and other cellulosic polymers.

Because they incorporate starch and perhaps other polymers susceptible to bacterial attack, the novel drilling fluids preferably comprise a biocide. Suitable biocides useful in the novel drilling fluids include formaldehydes, paraformaldehydes, glutaraldehyde, and isothiazolones. Other biocides suitable for use in drilling fluids are known to workers in the art and may be used in the subject invention.

Other conventional additives are known to workers in the art and may, if desired, be used in the subject invention, such as rheological additives and weighting agents. It is generally expected that additives of the type used in aqueous, polymer based drilling fluids may be used to advantage in the novel fluids, and the desirability and compatibility of such conventional additives may be determined by routine experimentation.

Making and Using the Novel Clay Stabilizing Drilling Fluids

Typical components and their concentrations in the novel fluids are described above. The choice of a particular composition among those generally suitable for use in the novel fluids and the concentration thereof, however, will depend on the precise chemical and physical properties of the fluid that are needed for a particular drilling operation. Cost considerations also may come into play. Workers in the art may optimize the precise formulation of the novel fluids for a particular application by reference to principles well known in the art and by routine experimentation.

For example, the viscosity and other rheological and thixotropic properties of the novel fluids in large part are a function of the properties of the polymer component and the polymer concentration. The viscosity of the fluid generally is increased by increasing the polymer concentration. It may be more cost effective, however, to use a higher molecular weight polymer or a polymer having a higher degree of hydrolysis at a relatively fixed polymer concentration. Conversely, the viscosity may be reduced by using a lower molecular weight polymer, a lower polymer concentration, or, in some cases, a polymer having a lower degree of hydrolysis.

Moreover, it will be appreciated that various functions and mechanisms have been ascribed to each component of the novel fluids and their effect of the overall properties of the fluid. While such explanations are believed to be accurate, it will be understood that the invention is not limited thereby. As demonstrated by the examples which follow, regardless of their respective particular properties or their effectiveness or mechanisms in other known fluids, the combination of the polymer, starch, and clay stabilizer as described, especially when combined with a surfactant and lubricant, synergistically to provide the novel drilling fluids with superior clay stabilizing properties.

Specifically, it has been found that the novel fluids as described have performance comparable to oil and synthetic base fluids in respect to problems associated with shale and other clay bearing formations. More particularly, they have been found to provide shale inhibition of less than about 10%, and more desirably, less than about 5%. They also have been found to provide shale disintegration performance of less than about 10%, and more desirably, less than about 5%. As used herein, shale inhibition values are reported as percent increase in sample length at 4 hours and are determined by reference to Pierre shale using a linear swell meter and immersing the sample in fluid heated to 180° F. Shale disintegration values are reported in terms of percent shale lost and are determined by reference to Pierre shale by adding 20 grams of shale to a 350 cc sample of fluid, hot-rolling for 16 hours at 150° F., screening, washing, and drying the sample, and weighing the recovered shale.

In general, the novel drilling fluids may be made and circulated by methods and equipment well known and used by workers in the art. The components of the novel fluids may be admixed into the aqueous base fluid by conventional means in conventional mixing tanks. Likewise, the fluid may be circulated with conventional hydraulic pumps into the drill string, and when circulated back to the surface the cuttings may be removed and the fluid reconstituted as desired.

It will be appreciated, therefore, that while the novel clay stabilizing drilling fluids have performance comparable to oil and synthetic base fluids in respect to problems associated with shale and other clay bearing formations, they may be more easily and economically prepared and circulated in drilling operations. Water is much cheaper than oil or synthetic fluids, and if seawater is available on site, the cost of transporting fluid is also avoided. Because water constitutes the predominant liquid phase in the novel drilling fluids, they may be disposed of more easily and cheaply. Oil and synthetic fluids typically must be treated with special bacterial agents or other mechanical or chemical processes at much greater expense. Likewise, water does not pose the safety concerns that are associated with the oils and synthetic fluids commonly used in drilling fluids.

Also, while the novel fluids have been described for use in drilling a well bore, it to will be appreciated that they also may be used to advantage in various completion, workover, or kill operations as are typically performed to enhance production from a hydrocarbon well. As used herein, therefore, drilling operations shall encompass such operations as well as the process of drilling a well bore. Moreover, while the novel fluids are particularly useful in drilling wells for hydrocarbon production, they may be used to advantage in other well drilling operations.

EXAMPLES

The invention and its advantages may be further understood by reference to the following examples. It will be appreciated, however, that the invention is not limited thereto.

Example 1

Preparation of Drilling Fluids

A drilling fluid within the scope of the subject invention was prepared by admixing various components in fresh water. The polymer was a commercially available 95:5 polyanionic cellulose-guar gum mixture. The starch was a 95:5 blend of potato and corn starch modified to impart bacterial resistance. The clay stabilizer was a commercially available amine-based stabilizer. The lubricant was a commercially available drilling lubricant, as was the surfactant.

Bentonite gel, polymer based, and chrome lignosulfate water-based drilling fluids, as are typical of prior art fluids, were prepared for comparative purposes. The composition of the novel drilling fluid, designated as Fluid 1, and the prior art fluids, designated as Fluids 2-4, are set forth below in Table 1.

TABLE 1

| Fluid Components | Concentration (lbs/bbl - unless noted otherwise) | | | |
| --- | --- | --- | --- | --- |
| | Fluid 1 | Fluid 2 | Fluid 3 | Fluid 4 |
| Polymer | 1.5 | | | |
| Starch | 10 | | | |
| Clay Stabilizer | 2 vol % | | | |
| Lubricant | 2.5 vol % | | | |
| Surfactant | 3 vol % | | | |
| Barite | 256 | 256 | 256 | 256 |
| Bentonite | | 25 | 15 | 25 |
| Drispac | | 0.5 | | |
| Caustic Soda | | 0.5 | 0.5 | |
| Lignite | | | 4 | 11 |
| PAC Polymer | | | 2 | |
| Soda Ash | | | | 1 |

Example 2

Rheological and Chemical Properties of Fluids

Various rheological and chemical properties of the fluids were determined. Funnel viscosity was measured by a Marsh funnel in accordance with A.P.I. standard procedures. Rotational viscosity was measured by a 6-speed Farm rheometer in accordance with standard A.P.I. procedures.

Those properties are set forth below in Table 2.

TABLE 2

| Fluid Properties | Fluid 1 | Fluid 2 | Fluid 3 | Fluid 4 |
| --- | --- | --- | --- | --- |
| Funnel Viscosity | 57 | 65 | 59 | 61 |
| Fann 600 Reading | 87 | 97 | 51 | 53 |
| Fann 300 Reading | 57 | 69 | 39 | 38 |
| Plastic Viscosity | 30 | 28 | 12 | 15 |
| Yield Point | 27 | 41 | 27 | 23 |
| 10-second Gel | 5 | 7 | 9 | 8 |
| 10-minute Gel | 8 | 16 | 21 | 15 |
| A.P.I. Filtrate Loss | 2.6 cc | 12.5 cc | 15.8 cc | 14.3 cc |
| pH | 8.5 | 10.5 | 10.0 | 9.3 |

It will be appreciated from the foregoing tests, that the novel fluid has excellent rheological properties and gel strength such as are required for drilling fluid applications and compares quite favorably with the prior art fluids. It also will be noted that the novel fluid did not require additives such as caustic soda, which can create handling and disposal problems, to reach a relatively high pH, i.e., above 7.

Other properties of the fluids then were investigated, namely, filtrate loss and lubricity coefficient. Filtrate loss was determined in accordance with A.P.I. standard procedures. Lubricity was determined using an Ashland Model 65 lubricity meter. The results are set forth below in Table 3.

TABLE 3

| Fluid Properties | Fluid 1 | Fluid 2 | Fluid 3 | Fluid 4 |
| --- | --- | --- | --- | --- |
| A.P.I. Filtrate Loss | 2.6 cc | 12.5 cc | 15.8 cc | 14.3 cc |
| Lubricity Coefficient | 0.08 | 0.38 | 0.31 | 0.43 |

It will be appreciated from the foregoing tests, that the novel fluid has excellent filtrate loss properties, superior to those of the prior art water-based fluids. Similarly, the lubricity coefficient of the novel fluid was superior to the prior art water-based fluids, and was even superior to typical diesel oil based fluids which have lubricity values of approximately 0.15.

Example 3

Resistance to Contamination of Fluids

The fluids prepared in Example 1 were then tested to determine the effects of common contaminants, represented by (a) 10% sodium chloride water and (b) a combination of 2% cement and 8 lb/bbl rev dust. The contaminants were added to samples of the fluids, and the effects of the contaminants on various rheological properties were measured.

The results of those tests are set forth below, respectively, in Tables 4 and 5.

TABLE 4

| | Fluid 1 | | Fluid 2 | | Fluid 3 | | Fluid 4 | |
| --- | --- | --- | --- | --- | --- | --- | --- | --- |
| Fluid Properties | Before | After | Before | After | Before | After | Before | After |
| Funnel Viscosity | 59 | 62 | 63 | 79 | 59 | 68 | 61 | 73 |
| Plastic Viscosity | 35 | 38 | 36 | 51 | 12 | 26 | 15 | 29 |
| Yield Point | 23 | 25 | 23 | 59 | 27 | 51 | 23 | 48 |

TABLE 5

| Fluid Properties | Fluid 1 | | Fluid 2 | | Fluid 3 | | Fluid 4 | |
| --- | --- | --- | --- | --- | --- | --- | --- | --- |
| | Before | After | Before | After | Before | After | Before | After |
| Funnel Viscosity | 60 | 64 | 65 | 131 | 59 | 118 | 61 | 108 |
| Plastic Viscosity | 32 | 36 | 28 | 46 | 12 | 28 | 15 | 32 |
| Yield Point | 21 | 23 | 41 | 74 | 27 | 49 | 23 | 54 |

It will be noted from the foregoing data that the rheological properties of the novel fluid were substantially unaffected by the contaminants while the prior art fluids were critically impaired. In addition, the novel fluid was tested to determine the effects of contamination of saturated sodium chloride and seawater. Results comparable to those noted above were observed establishing that the rheological properties of the novel fluid also were substantially unaffected by such contaminants.

Example 4

Clay Stabilizing Properties of Fluids

The fluids prepared in Example 1 were then tested to determine their shale to inhibition and shale disintegration properties. Shale inhibition properties are expressed as percent increase in sample length at four hours as determined by reference to Pierre shale using a linear swell meter and immersing the sample in fluid heated to 180° F. Shale disintegration properties are expressed as percent shale lost as determined by reference to Pierre shale by adding 20 grams of shale to a 350 cc sample of fluid, hot-rolling for 16 hours at 150° F., screening, washing, and drying the sample, and weighing the recovered shale.

The results of those tests are set forth below, respectively, in Table 6.

TABLE 6

| Fluid Properties | Fluid 1 | Fluid 2 | Fluid 3 | Fluid 4 |
| --- | --- | --- | --- | --- |
| Shale Inhibition (% swelling) | 7.34% | 15.61% | 19.82% | 13.24% |
| Shale Disintegration (% lost) | 8.9% | 65.39% | 62.18% | 58.62% |

It will be noted from the foregoing data that the novel drilling fluid exhibits far better clay stabilization properties than are demonstrated by the prior art water-based drilling fluids. Moreover, it will be noted that during the most critical first hour of contact, the novel drilling fluid resulted in only 2.8% swelling of the shale sample.

Example 5

Environmental Properties of Fluids

The novel fluid prepared in Example 1 was tested in accordance with the LC-50 (standard shrimp test) and passed, most samples showing LC>700,000. Likewise, the novel fluid passed the Canadian Micro Toxicity requirement and the ASTM Standard D-5660. This demonstrates that the novel fluid is extremely compatible with environmental concerns, especially as compared to oil and synthetic based systems.

The foregoing examples demonstrate the excellent physical, chemical, and rheological properties of the novel clay stabilizing fluids and, therefore, their suitability for use in a drilling environment. In particular, they demonstrate that the novel fluids are not only suitable for use as drilling fluids, but that they have clay stabilizing properties comparable to oil and synthetic base fluids.

While this invention has been disclosed and discussed primarily in terms of specific embodiments thereof, it is not intended to be limited thereto. Other modifications and embodiments will be apparent to the worker in the art.

What is claimed is:

1. A fluid for circulation through a well during drilling operations, said drilling fluid comprising:
   a. an aqueous base fluid;
   b. a viscosifying polymer;
   c. a starch; and
   d. a chloride-free clay stabilizer; wherein said viscosifying polymer, starch, and clay stabilizer are present in amounts effective to provide said fluid with clay swelling of about 5% or less and shale disintegration of about 5% or less.

2. The drilling fluid of claim 1, wherein said starch is selected from the group consisting of potato and corn starch and mixtures.

3. The drilling fluid of claim 2, wherein said starch is modified to impart resistance to bacterial attack.

4. The drilling fluid of claim 2, wherein said starch is present in an amount from about 6 to about 18 lb/bbl of fluid.

5. The drilling fluid of claim 4, where said clay stabilizer is an amine-based stabilizer or mixtures thereof.

6. The drilling fluid of claim 5, wherein said chloride-free clay stabilizer is present in an amount up to about 3% by volume.

7. The drilling fluid of claim 5, wherein said chloride-free clay stabilizer is present in an amount from about 1 to about 3% by volume.

8. The drilling fluid of claim 2, wherein said starch is present in an amount from about 6 to about 12 lb/bbl of fluid.

9. The drilling fluid of claim 2, where said clay stabilizer is an amine-based stabilizer or mixtures thereof.

10. The drilling fluid of claim 9, wherein said chloride-free clay stabilizer is present in an amount up to about 3% by volume.

11. The drilling fluid of claim 10, wherein said fluid comprises a surfactant.

12. The drilling fluid of claim 11, where said surfactant is present is amounts up to about 3.5% by volume.

13. The drilling fluid of claim 11, wherein said fluid comprises a lubricant.

14. The drilling fluid of claim 13, wherein said lubricant is present in an amount up to about 3.5% by volume.

15. The drilling fluid of claim 10, wherein said fluid comprises a lubricant.

16. The drilling fluid of claim 15, wherein said lubricant is present in an amount up to about 3.5% by volume.

17. The drilling fluid of claim 9, wherein said chloride-free clay stabilizer is present in an amount from about 1 to about 3% by volume.

18. The drilling fluid of claim 1, wherein said starch is present in an amount from about 6 to about 18 lb/bbl of fluid.

19. The drilling fluid of claim 1, where said clay stabilizer is an amine-based stabilizer or mixtures thereof.

20. The drilling fluid of claim 1, wherein said chloride-free clay stabilizer is present in an amount up to about 3% by volume.

21. The drilling fluid of claim 1, wherein said starch is modified to impart resistance to bacterial attack.

22. The drilling fluid of claim 1, wherein said starch is present in an amount from about 6 to about 12 lb/bbl of fluid.

23. A fluid for circulation through a well during drilling operations, said drilling fluid comprising:
   a. an aqueous base fluid;
   b. a viscosifying polymer;
   c. a starch selected from the group consisting of potato and corn starch and mixtures thereof and present in an amount from about 6 to about 18 lb/barrel of fluid; and
   d. a chloride-free clay stabilizer; wherein said viscosifying polymer, starch, and clay stabilizer are present in amounts effective to provide said fluid with shale disintegration of about 5% or less.

24. The drilling fluid of claim 23, wherein said starch is modified to impart resistance to bacterial attack.

25. The drilling fluid of claim 24, wherein said starch is present in an amount from about 6 to about 12 lb/bbl of fluid.

26. The drilling fluid of claim 24, where said clay stabilizer is an amine-based stabilizer or mixtures thereof.

27. The drilling fluid of claim 26, wherein said chloride-free clay stabilizer is present in an amount from about 1 to about 3% by volume.

28. The drilling fluid of claim 23, wherein said starch is present in an amount from about 6 to about 12 lb/bbl of fluid.

29. The drilling fluid of claim 23, where said clay stabilizer is an amine-based stabilizer or mixtures thereof.

30. The drilling fluid of claim 29, wherein said chloride-free clay stabilizer is present in an amount up to about 3% by volume.

31. The drilling fluid of claim 23, wherein said chloride-free clay stabilizer is present in an amount up to about 3% by volume.

32. The drilling fluid of claim 23, wherein said fluid comprises a surfactant.

33. The drilling fluid of claim 32, where said surfactant is present is amounts up to about 3.5% by volume.

34. The drilling fluid of claim 23, wherein said fluid comprises a lubricant.

35. The drilling fluid of claim 34, wherein said lubricant is present in an amount up to about 3.5% by volume.

36. A method for controlling production of hydrocarbons from a well bore during drilling operations, which method comprising introducing the drilling fluid of claim 1 into said well bore.

37. A method for controlling production of hydrocarbons from a well bore during drilling operations, which method comprising introducing the drilling fluid of claim 4 into said well bore.

38. A method for controlling production of hydrocarbons from a well bore during drilling operations, which method comprising introducing the drilling fluid of claim 6 into said well bore.

39. A method for controlling production of hydrocarbons from a well bore during drilling operations, which method comprising introducing the drilling fluid of claim 23 into said well bore.

40. A method for controlling production of hydrocarbons from a well bore during drilling operations, which method comprising introducing the drilling fluid of claim 31 into said well bore.

* * * * *